United States Patent
Joi et al.

(10) Patent No.: US 10,740,705 B2
(45) Date of Patent: *Aug. 11, 2020

(54) SURVEY INSIGHT REPORTING SYSTEM AND METHOD

(71) Applicant: Energage, LLC, Exton, PA (US)

(72) Inventors: Richard Johnson Joi, Lancaster, PA (US); Zachary Jordan Leaman, East Earl, PA (US); Douglas John Claffey, Malvern, PA (US); Ethan Salk, Glenside, PA (US); Kinsey Smith, Royersford, PA (US)

(73) Assignee: ENERGAGE, LLC, Exton, PA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/106,477

(22) Filed: Aug. 21, 2018

(65) Prior Publication Data

US 2018/0357579 A1 Dec. 13, 2018

Related U.S. Application Data

(63) Continuation of application No. 15/943,990, filed on Apr. 3, 2018, now Pat. No. 10,055,701, which is a
(Continued)

(51) Int. Cl.
*G06F 3/0484* (2013.01)
*G06Q 10/06* (2012.01)
(Continued)

(52) U.S. Cl.
CPC ........... *G06Q 10/063* (2013.01); *G06F 9/451* (2018.02); *G06T 11/206* (2013.01);
(Continued)

(58) Field of Classification Search
CPC .......... G06F 21/00; G06F 17/30; G06F 17/60; G06Q 40/00; G06Q 10/1095; G06Q 10/10

See application file for complete search history.

(56) References Cited

U.S. PATENT DOCUMENTS

| 5,878,214 A | 3/1999 | Gilliam et al. |
| 8,195,497 B2 | 6/2012 | Montgomery |

(Continued)

OTHER PUBLICATIONS

An Agenda App for an IPad, http://agendasapp.com (Copyright 2012) US.
(Continued)

*Primary Examiner* — Rashawn N Tillery
(74) *Attorney, Agent, or Firm* — Belles Katz LLC

(57) ABSTRACT

In one embodiment, the invention can be a method of displaying survey results. The method can include, for each of a plurality of survey items, receiving survey responses from survey respondents, wherein each response is chosen from response options, the response options corresponding to an ordinal scale; each respondent is associated with a collection of respondent segments; and each response to each item by each survey respondent corresponds with a response score. The method can further include, for each item and respondent segment, determining a composite score based on the response score. Further, response groupings can be displayed according to a noteworthiness ranking that is based on at least two of the composite score, a change in the composite score, and a sum of weights for each respondent segment.

20 Claims, 10 Drawing Sheets

Related U.S. Application Data continuation-in-part of application No. 14/932,017, filed on Nov. 4, 2015, now Pat. No. 10,332,052.

(60) Provisional application No. 62/480,684, filed on Apr. 3, 2017, provisional application No. 62/075,097, filed on Nov. 4, 2014.

(51) Int. Cl.
*G06F 9/451* (2018.01)
*G06T 11/20* (2006.01)
*G06T 11/60* (2006.01)

(52) U.S. Cl.
CPC .......... *G06F 3/04842* (2013.01); *G06T 11/60* (2013.01); *G06T 2200/24* (2013.01)

(56) References Cited

U.S. PATENT DOCUMENTS

| | | |
|---|---|---|
| 8,266,534 B2 | 9/2012 | Curtis et al. |
| 8,935,312 B2 | 1/2015 | Gartner et al. |
| 2004/0148208 A1 | 7/2004 | Weathersby |
| 2005/0125246 A1 | 6/2005 | Muller et al. |
| 2006/0173785 A1 | 8/2006 | Behbehani |
| 2007/0271337 A1 | 11/2007 | Olson |
| 2007/0282663 A1 | 12/2007 | Barlament |
| 2008/0010351 A1 | 1/2008 | Wardhaugh et al. |
| 2008/0147706 A1 | 6/2008 | Anglin et al. |
| 2008/0162244 A1 | 7/2008 | Oral et al. |
| 2008/0249787 A1 | 10/2008 | Harrison |
| 2008/0288331 A1 | 11/2008 | Magids et al. |
| 2011/0047213 A1 | 2/2011 | Manuel |
| 2013/0117060 A1 | 5/2013 | Henriksen et al. |
| 2013/0325779 A1 | 12/2013 | Shahshahani et al. |
| 2014/0081650 A1 | 3/2014 | Sachs |
| 2014/0140675 A1 | 5/2014 | de Sa et al. |
| 2014/0344702 A1 | 11/2014 | Edge et al. |
| 2015/0089399 A1 | 3/2015 | Megill et al. |
| 2015/0154291 A1 | 6/2015 | Shepherd et al. |
| 2015/0271206 A1 | 9/2015 | Schultz et al. |
| 2016/0092578 A1 | 3/2016 | Ganani |
| 2016/0117624 A1 | 4/2016 | Flores et al. |
| 2016/0124593 A1 | 5/2016 | Joi et al. |
| 2016/0210644 A1 | 7/2016 | Brewer et al. |

OTHER PUBLICATIONS

KickStart Alliance Interactive Meetings Exponential Results, http://www.kickstartall.com/resources/archives/interactive-meetings-exponential-results/ (2015) US.

International Search Report for corresponding Application No. PCT/US2018/025832, dated Jun. 22, 2018. WO.

SURVEY INSIGHT REPORTING SYSTEM AND METHOD

CROSS REFERENCE TO RELATED APPLICATIONS

The present application is a continuation of U.S. patent application Ser. No. 15/943,990, filed Apr. 3, 2018, now U.S. Pat. No. 10,055,701, which is a continuation-in-part of U.S. patent application Ser. No. 14/932,017, filed Nov. 4, 2015, which claims the benefit of U.S. Provisional Patent Application No. 62/075,097 filed Nov. 4, 2014. U.S. patent application Ser. No. 15/943,990 further claims the benefit of U.S. Provisional Patent Application No. 62/480,684, filed on Apr. 3, 2017. The disclosures of these references are incorporated herein by reference in their entireties.

BACKGROUND

Surveys can provide several benefits, including enabling a company to better understand its workforce. Survey items can address issues such as engagement, organizational health, and satisfaction. Employee feedback can help an employer diagnose problems and find new opportunities for improvement.

When responses to a survey correspond to an ordinal scale, there can be challenges in accurately summarizing those responses. Responses according to an ordinal scale are responses that can be ranked in an order and thereby sorted. Likert scale responses (e.g., Strongly-Disagree/Disagree/Neutral/Agree/Strongly-Agree, or Bad/Needs-Improvement/Good/Excellent) are an example of ordinal scale responses.

There are two common methods for summarizing groups of responses to an ordinal scale so that the groups of responses can be compared. In the percent positive approach, scale options are divided into "positive" and "not positive" groups. The summary of a group of responses is the percentage of the responses that are positive.

Another method is the integer assignment approach. In this approach, increasing successive integers are assigned to each of the scale options. The summary of a group of responses is then the arithmetic mean, geometric mean, or median of the assigned integers.

Further, there are many methods for comparing a group score (e.g., a score for a company) to a benchmark score. In the subtraction method, the benchmark score is subtracted from the group score, and the result, which can be positive or negative, is the distance from the benchmark. For example, a group might be 5 percentage points more positive than the benchmark. In the ranks method, if the benchmark data can be divided into groups that are similar to the group being compared to the benchmark, then the groups can be ordered and a rank for the group calculated. For example, a group might be $3^{rd}$ out of 30. The percentile method is the same as the ranks method, but instead of reporting $3^{rd}$ out of 30, it is reported as the $90^{th}$ percentile. The z-score method is built on dividing the benchmark into groups similar to the group being compared to the benchmark. In this method, the standard deviation for the set of benchmark scores is calculated. Then, the subtraction method described above is used. But instead of reporting the difference, the difference is divided by the benchmark's standard deviation resulting in a number known as a z-score, which is essentially the number of standard deviations the group score is from the benchmark average.

Percent Positive Approach

There are shortcomings with the above approaches. For example, with the percent positive approach, the positive response options (agree, strongly agree) can be grouped together and the score reported can be the percentage of all responders who responded positively. These percentages can then be compared to percentages from similar companies. For example, a company may receive a score of 85% positive on an item about appreciation. The fact that a group of similar companies averaged 73% positive on the appreciation item would lead the company to conclude that they were doing well at appreciating their employees.

The fundamental drawback to this approach is information loss. By collapsing multiple response options (typically five or seven) into two (positive or not positive), information is lost. Specifically, enthusiasm level is lost. No distinction is made between a positive person and an enthusiastic person. Similarly, no distinction is made between a neutral person and an angry person. Information loss can be acceptable when there is no benchmark data available or only poor benchmark data available. With good benchmark data available, however, the loss of information can interfere with making better decisions about how to take cost-effective action.

Integer Assignment Approach

As another example, the integer assignment approach discussed above also has shortcomings. Table 1 below shows an example mapping of a seven-category Likert-type scale to the integers zero through six. Scores are then reported by converting each category on the response scale to an integer using the mapping and then calculating the arithmetic mean of the integers.

TABLE 1

| Category | Integer |
| --- | --- |
| Strongly disagree | 0 |
| Disagree | 1 |
| Slightly disagree | 2 |
| Neutral | 3 |
| Slightly agree | 4 |
| Agree | 5 |
| Strongly agree | 6 |

These averages can then be compared to averages from similar companies. For example, a company might get a score of 4.38 on an item about appreciation. The fact that a group of similar companies averaged 3.97 on the appreciation item would lead the company to conclude that they were doing well at appreciating their employees.

The integer assignment approach (sometimes referred to as the average score approach) improves on the percent positive approach in that each response option is treated differently, and thus information is not lost. But this approach suffers from the same lack of calibration drawback as the percent positive approach, and it introduces the new drawback of assuming that the response options are all equidistant from each other.

Every survey item has its own unique response characteristics. The most obvious characteristic that varies by item is how easy the item is to agree with. For example, across a broad population, an item about pay will always receive a lower average than an item about ethics. This is because employees generally have a more negative view of their pay than they do of their companies' ethics. These differences can be adjusted for by comparing the average score to a benchmark value.

In addition to different expected values, however, each item also has a different distribution or spread of responses. Put another way, different items have different degrees of expected variation in the responses. Because of this, it can be difficult to compare an average score to a benchmark and know whether the difference is large or inconsequential. The same difference can be large given the distribution of one survey item, and inconsequential given the distribution of another survey item.

For example, consider two survey items: an item about whether an employee thinks the company operates by strong ethics (ethics) and an item about how much negativity there is at their company (negativity). The negativity item will typically elicit more enthusiasm in both directions with far more people responding both strongly negative and strongly positive. Thus, the same size difference from the benchmark is far more important for the ethics item than it is for the negativity item. Put another way, a strongly negative response to the ethics item is rarer and more worrying than a strongly negative response to the negativity item.

Lack of calibration has varying levels of impact based on what kinds of scores are being looked at. Most obviously, this drawback is a big concern when looking at a single population and comparing how they scored on different items. Less obviously, this drawback is also a concern when comparing how different populations, like departments or locations, scored on a set of items. The issue here is that a problem on a narrowly distributed item can be masked by superficially good scores on items with wider distributions.

To understand this drawback, it's important to understand the different variable types. There are four kinds of variables: categorical (or nominal) variables, ordinal variables, interval variables, and ratio variables. A categorical variable is a variable in which the potential values do not have any intrinsic order. An example categorical variable is eye color. It is possible to say that one eye color is equal or not equal to another eye color, but it is not possible to say whether one eye color is greater than or less than another eye color.

An ordinal variable is a variable in which the potential values for the variable do have a clear agreed upon ordering, but no clear consensus on the relative distances between the values. An example of an ordinal variable is the job grades of team member, manager, and senior manager. It can be agreed that in terms of the hierarchy of the organization, a team member is at the lowest level, a senior manager is at the highest level, and a manager is in between. It's impossible to say, however, whether the gap between team member and manager is larger or the gap between manager and senior manager is larger, and even if one could, it would be impossible to say by how much. One characteristic of ordinal variables is that adding them or taking the arithmetic mean does not make sense. A team member cannot be "added to" a senior manager to get the result of two managers.

An interval variable is a variable where the potential values have both a clear agreed upon ordering and clear agreement about the distance between the values. An example of an interval variable is number of hours worked per week. In this case, adding or taking the arithmetic mean of two variable values makes sense. If one person worked 20 hours in a week and another person worked 40 hours in a week, then we could reasonably say that the two people worked a total of 60 hours. Or, if together they made up a small department, we could say that on average, people in that department work 30 hours per week.

A ratio variable is a variable that includes all the characteristics of an interval variable, with the additional condition that it includes a meaningful zero, in which zero indicates that there is none of that variable. For example, number of hours worked per week has a clear order and distance between values, as with an interval variable. It is a ratio variable because a value of zero indicates that the individual did not work any hours that week.

A response on a Likert-type scale to a survey item is an ordinal variable. For example, it is clear that being strongly negative is worse than being negative, which is worse than being slightly negative. But a response on a Likert-type scale to a survey item is not an interval variable. For example, there is no definitive way to say that the distance between strongly disagree and disagree is the same as the distance from disagree to slightly disagree. Or, applying the arithmetic mean test, if you have a two-person department with one person who strongly agrees with a statement and one person who strongly disagrees with the statement, it's nonsensical to say that on average you have neutral people. On some level, having two people who passionately disagree with one another is exactly the opposite of having two neutral people.

The integer assignment approach, however, forces inherently ordinal responses on a Likert-type scale into being an interval variable. While this approach is simple, it is mathematically unfounded and introduces error into the scores. The equidistant point assumption drawback can be acceptable when looking at changes in scores from one time period to the next across larger populations in situations where no external benchmark data or only poor external benchmark data is available. In these cases, the noise will often balance out, and avoiding the information loss inherent in the percent positive approach is valuable. But in other cases, this approach can lead to unreliable results.

Z-Score Approach

The z-score approach is the least common and most sophisticated of the three common approaches for calculating survey scores. It can start with the same calculation used in the integer assignment approach. Next, the distance between the company score and the benchmark score is calculated by subtraction, which is also the same as the integer assignment approach. But in a third step, instead of reporting the calculated difference, the standard deviation of the scores that went into the benchmark average is calculated and the difference between the company score and benchmark score is divided by the standard deviation.

This approach improves on the average score approach by providing some calibration for the different response distributions of different survey items. It's easier to tell whether a particular score is an outlier or not because this approach reports smaller differences on items with tighter distributions as bigger, and it reports bigger differences on items with wide distributions as smaller.

At the same time, however, the z-score approach builds on the integer assignment approach by incorporating and amplifying the drawbacks of the integer assignment approach. Because calculating integer-based averages is the first step of the approach, the same equidistant point assumption drawback described under the subsection about the average scores approach also applies to the z-score approach. This z-score approach goes on to make this drawback worse because, just like the average calculation, the standard deviation calculation assumes interval data rather than the merely ordinal data generated by surveys using a Likert-type scale. The standard deviation calculation also assumes a normal distribution. However, the responses to most survey items that use a Likert-type scale are skewed towards one of the ends of the set of response options. In rare cases, responses are polarized with a dip in the middle. These issues can make the results of the standard deviation calculation misleading.

As discussed above, there are several shortcomings to the above methods for summarizing survey responses. These shortcomings interfere with the ability to systematically identify noteworthy insights hiding in survey response data. Previously, seasoned survey experts have had to subjectively and often inaccurately adjust for these shortcomings when making recommendations to organizations on what to focus on or celebrate. What is needed is an improved system and method for receiving survey responses, more accurately summarizing these responses and segments of these responses, and more accurately ranking the noteworthy aspects of these responses.

BRIEF SUMMARY

In one embodiment, a method of displaying survey results is disclosed, the method comprising: for each of a plurality of survey items, receiving survey responses from survey respondents, wherein: each response is chosen from response options, the response options corresponding to an ordinal scale; and each respondent is associated with a collection of respondent segments; and for each response to each item by each survey respondent, determining a calibrated score, the calibrated score based on a probability that a person having the collection of respondent segments associated with the survey respondent would provide either: the response to the item or any of the response options to the item that are lower on the ordinal scale; or the response to the item or any of the response options to the item that are higher on the ordinal scale; for each item, determining a composite score based on the calibrated score for each response to the item; for each respondent segment, determining a composite score based on the calibrated score for each response associated with the respondent segment; and providing a display of response groupings, the displayed response groupings comprising at least a portion of the plurality of items and the collection of respondent segments; wherein the displayed response groupings are located on the display along a first axis; and wherein the display includes, for each response grouping, a corresponding image, the corresponding image being located with respect to the first axis or a distinct second axis based on the composite score for the response grouping.

In another embodiment, a method of displaying survey results is disclosed, the method comprising: for each of a plurality of survey items, receiving survey responses from survey respondents, wherein: each response is chosen from response options, the response options corresponding to an ordinal scale; and each respondent is associated with a collection of respondent segments; and for each response to each item by each survey respondent, determining a calibrated score, the calibrated score based on a probability that a person having the collection of respondent segments associated with the survey respondent would provide either: the response to the item or any of the response options to the item that are lower on the ordinal scale; or the response to the item or any of the response options to the item that are higher on the ordinal scale; determining at least one of: for each item, a composite score based on the calibrated score for each response to the item; and for each respondent segment, a composite score based on the calibrated score for each response associated with the respondent segment; and providing a display of images, each image corresponding with one of the item or respondent segments; wherein each image is located with respect to a first axis based on the composite score associated with the image and its corresponding item or segment.

In another embodiment, a method of displaying survey results is disclosed, the method comprising: for each of a plurality of survey items, receiving survey responses from survey respondents, wherein: each response is chosen from response options, the response options corresponding to an ordinal scale; and each respondent is associated with a collection of respondent segments; and for each response to each item by each survey respondent, determining a calibrated score, the calibrated score based on a probability that a person having the collection of respondent segments associated with the survey respondent would provide either: the response to the item or any of the response options to the item that are lower on the ordinal scale; or the response to the item or any of the response options to the item that are higher on the ordinal scale; determining an organization composite score based on the calibrated score for each response; and providing a display comprising images corresponding with the organization composite score and other organization composite scores; wherein each image is located with respect to a first axis based on the associated organization composite score.

In another embodiment, a system for displaying survey results is disclosed, the system comprising: respondent devices configured to receive survey items and communicate survey responses to the items; and a server configured to carry out the steps of: for each item, receiving survey responses from respondent devices, wherein: each response is chosen from response options, the response options corresponding to an ordinal scale; and each respondent is associated with a collection of respondent segments; and for each response to each item by each survey respondent, determining a calibrated score, the calibrated score based on a probability that a person having the collection of respondent segments associated with the survey respondent would provide either: the response to the item or any of the response options to the item that are lower on the ordinal scale; or the response to the item or any of the response options to the item that are higher on the ordinal scale; for each item, determining a composite score based on the calibrated score for each response to the item; for each respondent segment, determining a composite score based on the calibrated score for each response associated with the respondent segment; and providing a display of response groupings, the displayed response groupings comprising at least a portion of the plurality of items and the collection of respondent segments; wherein the response groupings are located on the display along a first axis; and wherein the display includes, for each response grouping, a corresponding image, the corresponding image being located with respect to the first axis or a distinct second axis based on the composite score for the response grouping.

In another embodiment, a non-transitory computer-readable storage medium encoded with instructions is disclosed, which, when executed on a processor, perform the method of: for each of a plurality of survey items, receiving survey responses from survey respondents, wherein: each response is chosen from response options, the response options corresponding to an ordinal scale; and each respondent is associated with a collection of respondent segments; for each response to each item by each survey respondent, determining a calibrated score, the calibrated score based on a probability that a person having the collection of respondent segments associated with the survey respondent would provide either: the response to the item or any of the response options to the item that are lower on the ordinal scale; or the response to the item or any of the response options to the item that are higher on the ordinal scale; for each item, determining a composite score based on the calibrated score for each response to the item; for each respondent segment, determining a composite score based on the calibrated score for each response associated with the respondent segment; and providing a display of response groupings, the displayed response groupings comprising at least a portion of the plurality of items and the collection of respondent segments; wherein the response groupings are located on the display along a first axis; and wherein the display includes, for each response grouping, a corresponding image, the corresponding image being located with respect to the first axis or a distinct second axis based on the composite score for the response grouping.

In another embodiment, a method of displaying survey results is disclosed, the method comprising: for each of a plurality of survey items, receiving survey responses from survey respondents, wherein: each response is chosen from response options, the response options corresponding to an ordinal scale; each respondent is associated with a collection of respondent segments; and each response to each item by each survey respondent corresponds with a response score; for each item, determining a composite score based on the response score for each response to the item; for each respondent segment, determining a composite score based on the response score for each response associated with the respondent segment; and providing a display of response groupings, the displayed response groupings comprising at least a portion of the plurality of items and the collection of respondent segments; wherein the response groupings are located on the display along a first axis; and wherein the display includes, for each response grouping, a corresponding image, the corresponding image being located with respect to the first axis or a distinct second axis according to a noteworthiness ranking, the noteworthiness ranking being based on at least two of: the composite score for the response grouping; a change in the composite score for the response grouping from a previous composite score for the response grouping; and a sum of weights for each respondent segment, where each survey respondent or possible survey respondent is assigned a weight.

BRIEF DESCRIPTION OF THE DRAWINGS

The present disclosure will become more fully understood from the detailed description and the accompanying drawings, wherein.

DETAILED DESCRIPTION

Figure 1:
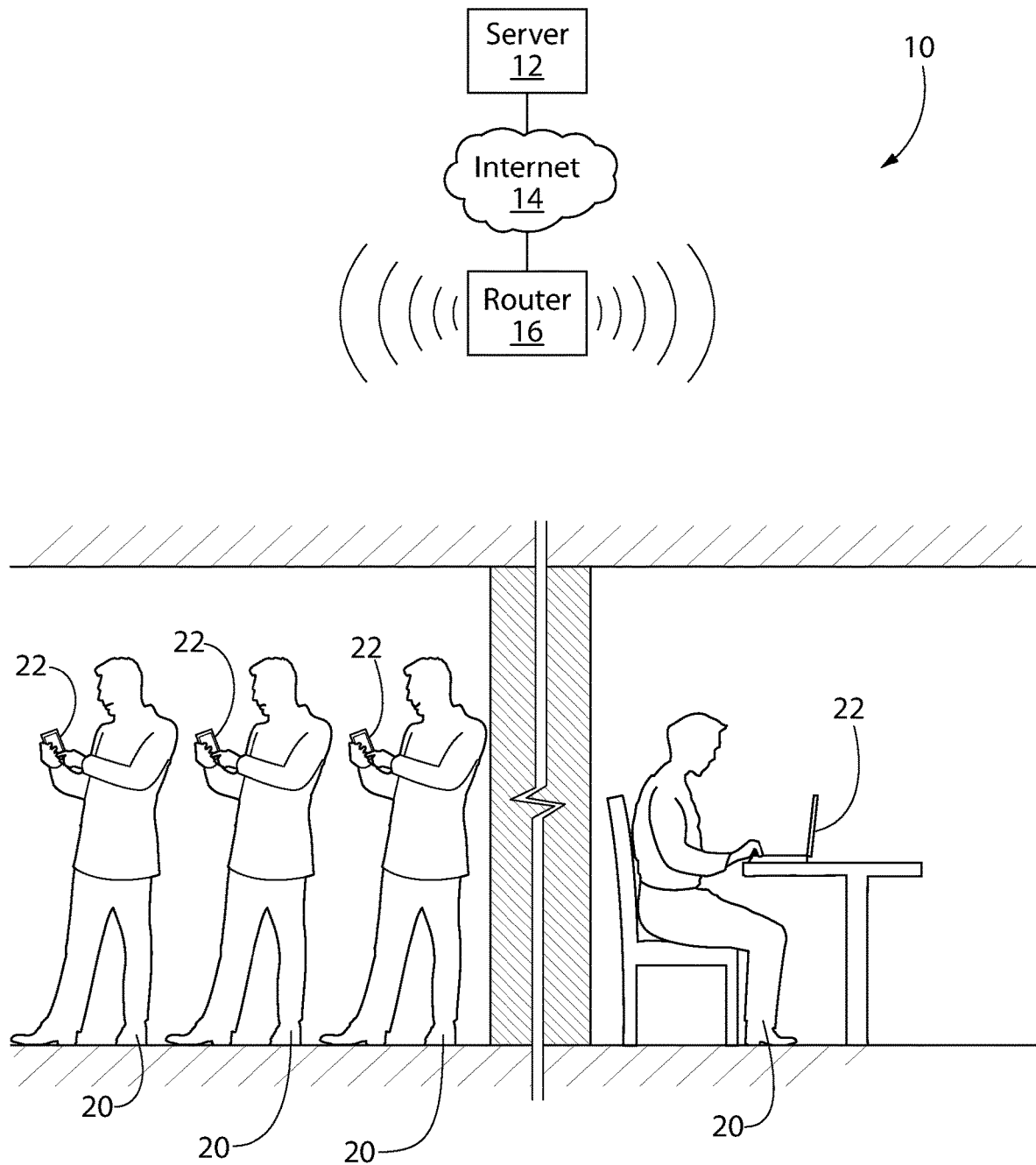
FIG. 1 is a system for communicating survey items and summarizing survey responses according to an embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Determining Probability of a Response Option

In the exemplified approach for summarizing ordinal scale responses, there is a determination of the probability of each response option or lower being chosen, either using benchmark data or using the responses from the group itself. A method for determining such a probability is shown in the following example, where there are four scale options for response: "Bad," "Needs Improvement," "Good," and "Excellent." One hundred responses were received, specifically, ten "Bad" responses, twenty "Needs Improvement" responses, forty "Good" responses, and thirty "Excellent" responses. These response results are shown in Table 2 below.

TABLE 2

|  | Bad | Needs improvement | Good | Excellent |
| --- | --- | --- | --- | --- |
| Response count | 10 | 20 | 40 | 30 |
| Percentage | 10% | 20% | 40% | 30% |
| Percentile | 5% | 20% | 50% | 85% |
| Odds | 1:19 (0.053) | 1:4 (0.25) | 1:1 (1) | 17:3 (5.67) |
| Log odds (logits) | −2.94 | −1.39 | 0 | 1.73 |
| Centilogits | −294 | −139 | 0 | 173 |

The percentages these responses represent for the total responses are, respectively, 10%, 20%, 40%, and 30%. Because the scale lacks granularity, it is assumed that half the responses to a particular option were intended to be more positive than was able to be expressed (and that half were intended to be less positive). Thus, the probability or percentile for each response option is calculated as half the percentage for the response option, plus the percentages of the lower response option. Thus, the Bad percentile is 10%/2 (or 5%), indicating there is a 5% probability that the response option chosen will be Bad. Similarly, the Needs Improvement percentile is 20%/2+10% (or 20%), thus indicating that there is a 20% chance that the response option chosen will be Needs Improvement or Bad. Similarly, the Good percentile is 40%/2+10%+20% (or 50%), and the Excellent percentile is 30%/2+10%+20%+40% (or 85%). In other embodiments, other percentages (other than 50%) can be used to determine the percentile. Further, more elaborate techniques can consider the "curve" of responses across the entire ordinal scale.

Next, from the percentiles (probabilities), the odds of a particular score or lower occurring can be determined for each response option. For something with a 5% probability, there is one "chance" that it will happen and 19 "chances" that it won't. Thus, the Bad odds are 1 to 19 or 0.053, the Needs Improvement odds are 1 to 4 or 0.25, the Good odds are 1 to 1 or 1, and the Excellent odds are 17 to 3 or 5.67.

From the odds, a logit score can be calculated for each response option, the logit values ranging from negative infinity to positive infinity. The Bad logit score is ln(1/19) (or −2.94), the Needs Improvement logit score is ln(1/4) (or −1.39), the Good logit score is ln(1/1) (or 0), and the Excellent logit score is ln(17/3) (or 1.73). These scores can be expressed in centilogits. A centilogit is one hundredth of a logit. Thus, as indicated in the table above, the respective scores in centilogits are −294, −139, 0, and 173.

These logit scores can be assigned to each response option. Accordingly, the logit scores can be used in a manner similar to the use of integers in the integer assignment approach (discussed above). Using logit scores instead of the integers helps to appropriately weight passion and outliers, which typically leads to better group decision making.

Further, the logit scores can be used to generate a summary score for a survey item. For example, suppose the above table represents the one hundred responses from five survey items asked of twenty different people. A summary score for a given one of these survey items where ten responders rated it Excellent, five rated it Good, four rated it Needs Improvement, and one rated it Bad can be obtained by applying the calculated logit scores to the response counts as follows:

$$\text{Summary score} = \frac{(-294)(1) + (-139)(4) + (0)(5) + (173)(10)}{20} = 44$$

The summary score can then be compared to the other four summary scores for the other survey items.

In the example provided above, the percentiles and logit scores are determined based on the survey responses received. While this approach can weight passion and outliers, a more preferred approach is to obtain percentiles and logit scores from benchmark data. These numbers can be obtained in the same manner as discussed above, but using benchmark survey responses from other companies. For example, using the above approach, benchmark data from a similarly situated company (or companies) can be used to determine the percentiles and logit scores for each response option for each survey item. The calculated logit scores can then be applied to the responses of the company being surveyed in a manner similar to the integer assignment approach. When using logit scores obtained from benchmark data, the system can granularly adjust for variations in item wording and demographic characteristics of responders.

Respondent Segments

In the exemplified embodiment, each survey respondent is associated with a collection of respondent segments. As used herein, the term "segment" or "respondent segment" can be any category, group, division, or classification by which by respondents and/or potential respondents can be grouped. A segment can be, for example, a demographic segment, such as respondent tenure (e.g., 5-10 years tenure), respondent hours worked (e.g., full-time or part-time), respondent salary range (e.g., over $50,000), respondent management level (e.g., manager), respondent department type (e.g., marketing), respondent role (e.g., paralegal), and country (e.g., India or Great Britain). The respondent segments can also be understood to include the respondent identities themselves, such as the name of an employee (e.g., John Smith) providing feedback regarding the organization to which he belongs.

The above approach can take into consideration certain expectation-setting segments of an organization. Expectation-setting segments are segments for which there is an expectation for how respondents belonging to the segment will respond to certain survey items. For example, if asked about the direction of the company, senior manager responses are likely to be unbalanced towards the positive, since they are generally responsible for setting the direction of the company. Thus, positive responses by this segment should not be taken as seriously as moderate or low responses. By contrast, lower-level employees are likely to be unbalanced towards the negative in response to this direction item, and thus positive responses from this segment would be more noteworthy. In an opposite manner, if asked about the execution of the direction of the company, senior managers are likely to be unbalanced towards the negative, and lower-level employees are likely to be unbalanced towards the positive. Thus, respondent management level can be considered an expectation-setting segment. Further, one might expect that people of a certain country (e.g., India) will respond to surveys more positively than people of another country (e.g., Europe), while people of other countries are expected to be in between. Other examples of potentially expectation-setting segments are respondent tenure, respondent salary range, and respondent department type. By considering a respondent's collection of associated segments and considering, based on those segments, what response to a survey item is expected, a survey system can better determine when responses are truly out of the ordinary and more noteworthy.

By contrast, other segments are not expectation-setting segments. Such segments can include (though do not necessarily include) location (there may be no expectation that employees in a Maine office will respond differently from those in a Vermont office), company-unique departments, and a segment representing a single individual. Such segments can be disregarded for purposes of setting expectations for a given survey item.

Calibrated Score

The above approach for determining a probability can be used to determine a custom score (e.g., a logit score) for each survey response to each survey item by each survey respondent. Each score can be based on the collection of expectation-setting segments that are associated with the survey respondent. More specifically, the score can be based on a probability that a person having the collection of respondent expectation-setting segments associated with the survey respondent would provide the survey response to the item or any of the response options to the item that are lower on the ordinal scale. A score based on this probability is referred to herein as a "calibrated score." In the exemplified embodiment, a logit score (in logits or centilogits) is used for the calibrated score. But the calibrated score is not so limited, as it can be another number based on a probability that a person having the collection of respondent segments associated with the survey respondent would provide the survey response or lower to the item, including the probability itself. For example, such a number could be a straight probability or straight odds.

For example, the exemplified embodiment can use benchmark data (or a superset of the responses being summarized) to calculate the probability that a full-time manager who makes between $50,000 and $100,000 and was hired between one and three years ago would respond to a specific statement about the direction of their company with a response of "Slightly Agree." As discussed above, the exemplified approach can use the item response count from the benchmark data to determine the percentage of benchmark respondents responding Slightly Agree or lower. This percentage is then divided in half to compensate for the ordinal scale's lack of full granularity, and to estimate the proportion of that option's responses that were actually intended to be more positive than was able to be expressed on the ordinal scale. This percentile can then be used, according to the method discussed above, to determine a calibrated score specific to the response (Slightly Agree), the survey item (regarding company direction), and the collection of segments to which the respondent belongs. In the exemplified embodiment, the calibrated score can be a logit-based score.

Survey System

Referring now to the figures, FIG. 1 is a system 10 for communicating survey items and summarizing survey responses according to an embodiment. The exemplified system 10 includes a server 12 and router 16 connected to the internet 14, as well as respondent devices 22. The respondent devices 22 belong to respondents 20.

In the exemplified embodiment, the system can provide survey items to a potential respondent in real-time, and can receive survey responses in real-time. For example, after a meeting, a manager can immediately send a survey item to the participants, and can view the responses in a response report that updates in real-time as the survey responses are received. In other embodiments, the method can use less rapid communications. In yet other embodiments, a more standard survey, such as a paper survey, can be used.

As used herein, the term "survey item" or "item" can refer to any statement, question, or topic for which a respondent can provide a response or rating. For example, an item can be the statement "I think the company is headed in a positive direction," and the response options can be Strongly Disagree, Disagree, Slightly Disagree, Neutral, Slightly Agree, Agree, and Strongly Agree.

The server 12 can be any computer or processor (or collection thereof) for carrying out programs in accordance with the functions described herein. In the exemplified embodiment, the server 12 communicates with the respondent devices 22 through an internet connection, the router 16 providing wireless internet connection to the respondent devices 22. In other embodiments, the server 12 can communicate with the respondent devices 22 through any standard communication means, including through use of a telecommunication network (e.g., 3G or 4G) or a wired internet connection (e.g., wired Ethernet cables).

Figure 2:
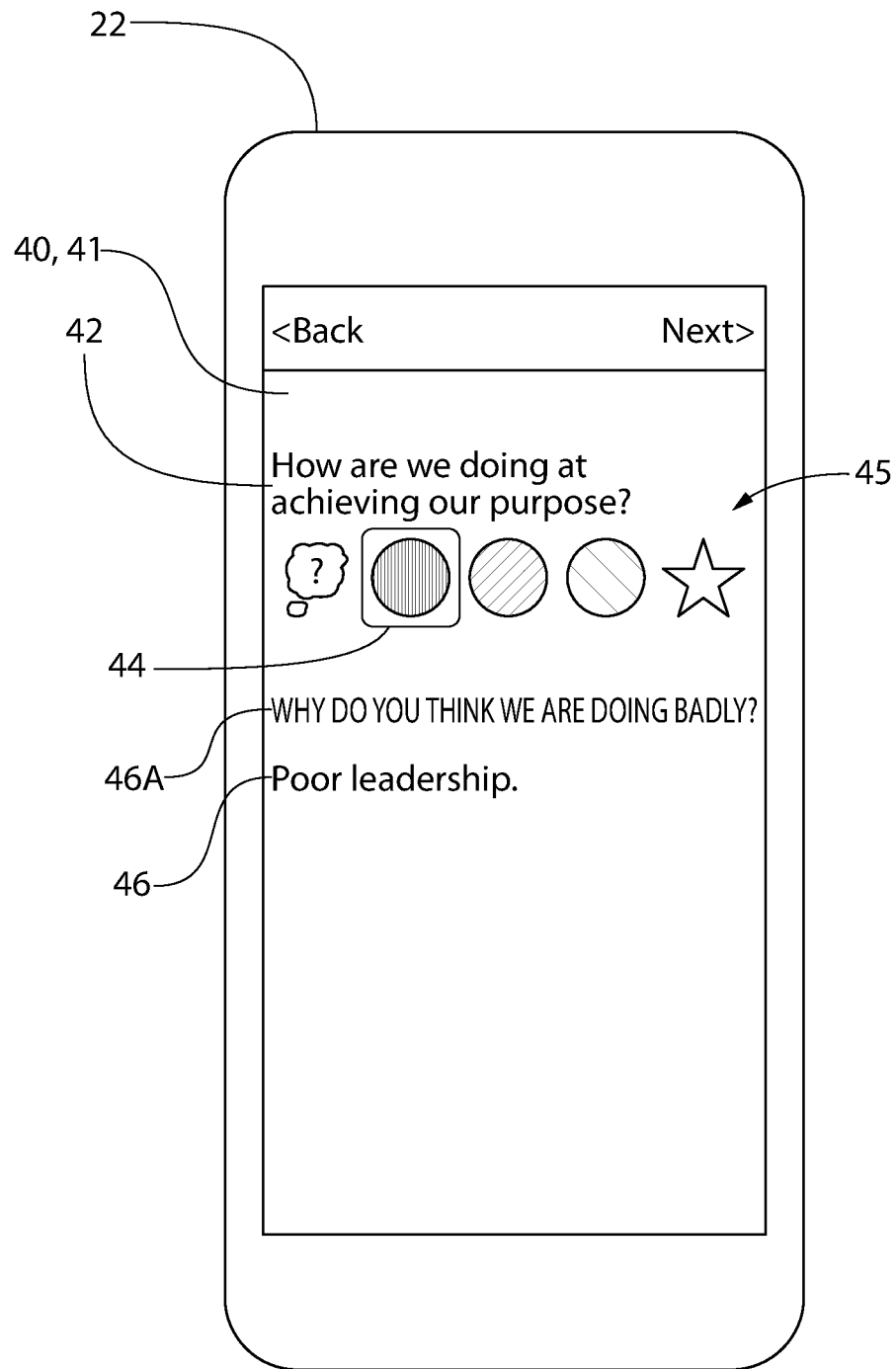
FIG. 2 is a user interface for a respondent device according to an embodiment.

FIG. 2 is a user interface 41 for a respondent device 22 according to an embodiment. In the exemplified embodiment, the respondent device 22 is a mobile smartphone. In other embodiments, the respondent device 22 can be any computer device capable of carrying out programs in accordance with the functions described herein (including laptop computers, desktop computers, and tablets). As stated above, in other embodiments, a more traditional survey system (e.g., a paper survey) can be used.

The user interface 41 of the exemplified respondent device 22 shows a first instance of a survey application 40. In the exemplified embodiment, the survey application 40 is a smartphone application. In other embodiments, the survey application 40 can be any program for carrying out the functions described herein. The respondent device 22 provides the respondent user interface 41. In the exemplified embodiment, the user interface 41 utilizes a touch screen provided by the smartphone. In other embodiments, the user interface can be any user interface capable of enabling a user to communicate with and carry out the functions described herein, including an interface utilizing a computer monitor, mouse, and/or keyboard.

The respondent user interface 41 shows a survey item 42, namely, "How are we doing at achieving our purpose?" The respondent user interface 41 provides response options 45 for a response. In the exemplified embodiment, there are four ordinal scale response options 45 to choose from (from left to right): a red circle (Bad), an amber circle (Needs Improvement), a green circle (Good), and a purple star (Exceptional). (There is also a fifth, non-ordinal scale response, a cloud representing No Answer.) The ordinal scale response options 45 represent different ratings of how the company is doing regarding achieving the organization's purpose. In the exemplified embodiment, the red circle represents the Bad rating, which can be described as follows: "There are significant problems that need to be dealt with urgently." The amber circle represents the Needs Improvement rating, which can be described as follows: "There are obvious and valuable improvements that can be made." The green circle represents the Good rating, which can be described as follows: "Nothing's perfect, but we are doing well overall." Finally, the purple star represents the Exceptional rating, which can be described as follows: "We are doing better here at achieving our purpose than anywhere else I know of." In the exemplified embodiment, the red option has been chosen as the response 44. In other embodiments, other rating options having other meanings can be available.

In the exemplified embodiment, there is also a request for comment 46A in which the respondent is asked to comment on why the chosen response 44 was given. In this embodiment, the respondent can provide an unstructured written comment 46. In the exemplified embodiment, the respondent states the organization has "Poor leadership." In other embodiments, structured responses (e.g., a list of possible explanations) can be provided for selection and/or unstructured responses can be eliminated.

Composite Scores

For each survey item, a composite score can be determined based on the calibrated score for each survey response to the item. For example, the composite score for an item can be an average of the calibrated scores associated with the item. In the preferred embodiment, the composite score is an average of the calibrated scores associated with the item. The average can be any type of average, including an arithmetic mean, a geometric mean, or a median. In yet other embodiments, the composite score can be another score for summarizing the relevant calibrated scores. The composite score for each item can be used for quantifying the noteworthiness or interestingness of the responses to a given item.

A composite score can also be determined for each respondent segment, the composite score based on the calibrated score for each survey response for the respondent segment. As with composite scores for items, the composite score for a segment can be determined as an average of the calibrated scores or by any other means of summarizing the relevant calibrated scores. The composite score for each segment can be used for quantifying the noteworthiness or interestingness of responses from different segments.

Generally, the term "composite score" for a given response grouping (e.g., survey item or segment) can refer to any single numeric representation of the response scores for that response grouping. The "response score" upon which the composite score is based can be a calibrated score (discussed herein) or any other type of numeric representation of an ordinal scale response, such as a z-score, a score indicating whether the response is positive or negative, or an integer assigned to the ordinal scale response. Thus, in certain embodiments, survey results can be displayed and ranked for noteworthiness without using calibrated scores. For example, the response score for each response can be determined based on whether the response is positive or negative, an integer assignment, or a z-score.

Display

Figure 3:
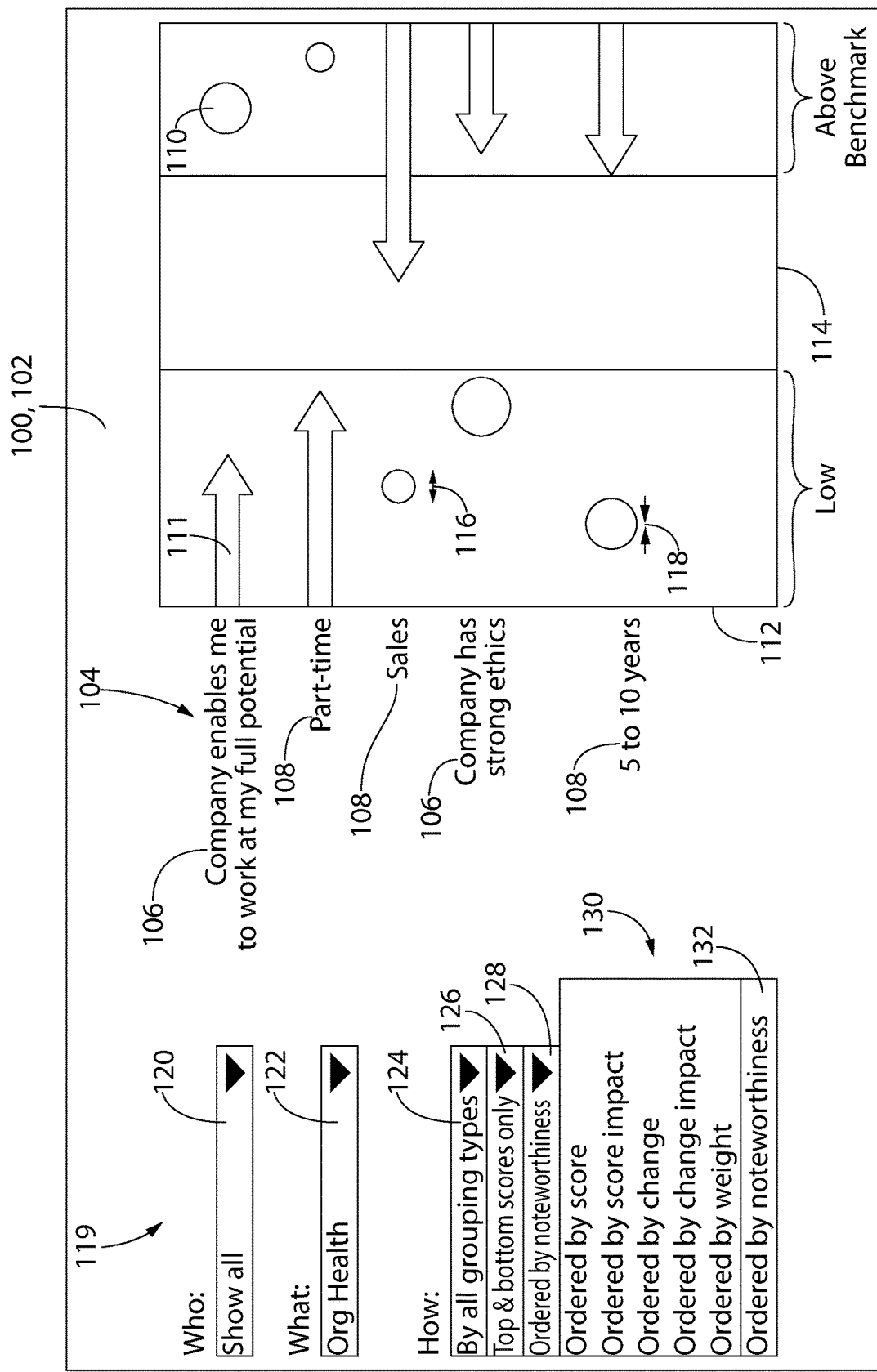
FIG. 3 is a display of a summary of survey responses according to an embodiment.

FIG. 3 is a display 100 of a summary of survey responses according to an embodiment. The exemplified display 100 includes a first axis 112 and a second axis 114. Along the first axis are several survey response groupings 104. As used herein, the term "response grouping" or "grouping" can refer to any survey item, survey segment, or combination of survey item(s) and/or survey segment(s) that forms a basis for grouping responses together. For example, a response grouping can be all the responses to a given survey item, or all the responses from a given segment, or a combination thereof. As shown in FIG. 3, the response groupings 104 comprise survey items 106 and survey segments 108. Each response grouping 104 has a corresponding image 110 that is located with respect to the second axis 114 based on the composite score for the response grouping 104. In the exemplified embodiment, the corresponding image 110 is a circle, though in other embodiments any other image (including a dot or a different shape) could be used. Further, the size of the images can be altered to reflect certain details about the associated item. For example, each displayed segment can have an image whose size is based on the total number of the survey respondents (or the total number of possible survey respondents) that correspond with the displayed segment. Further, each displayed survey item can have an image whose size is based on an item multiplier. The item multiplier can be based on any of the factors discussed herein with respect to multipliers.

The display also includes a change indicator 111 indicating a magnitude of a change in the composite score for the response grouping 104 from a previous composite score for the response grouping 104. In this embodiment, the change indicator 111 is an arrow and a length of the arrow is indicative of the magnitude of the change. One of the response groupings includes a polarization indicator 116 indicating polarization of the survey responses for the response grouping. Further, one of the response groupings includes a coalescence indicator 118 indicating coalescence in the survey responses for the response grouping. Polarization and coalescence will be discussed in greater detail below. It is further noted that the exemplified system can continue receiving new survey responses and update the determined scores and display accordingly. The system can also receive new benchmark data and update the scores and display accordingly.

Timeline View

Figure 10:
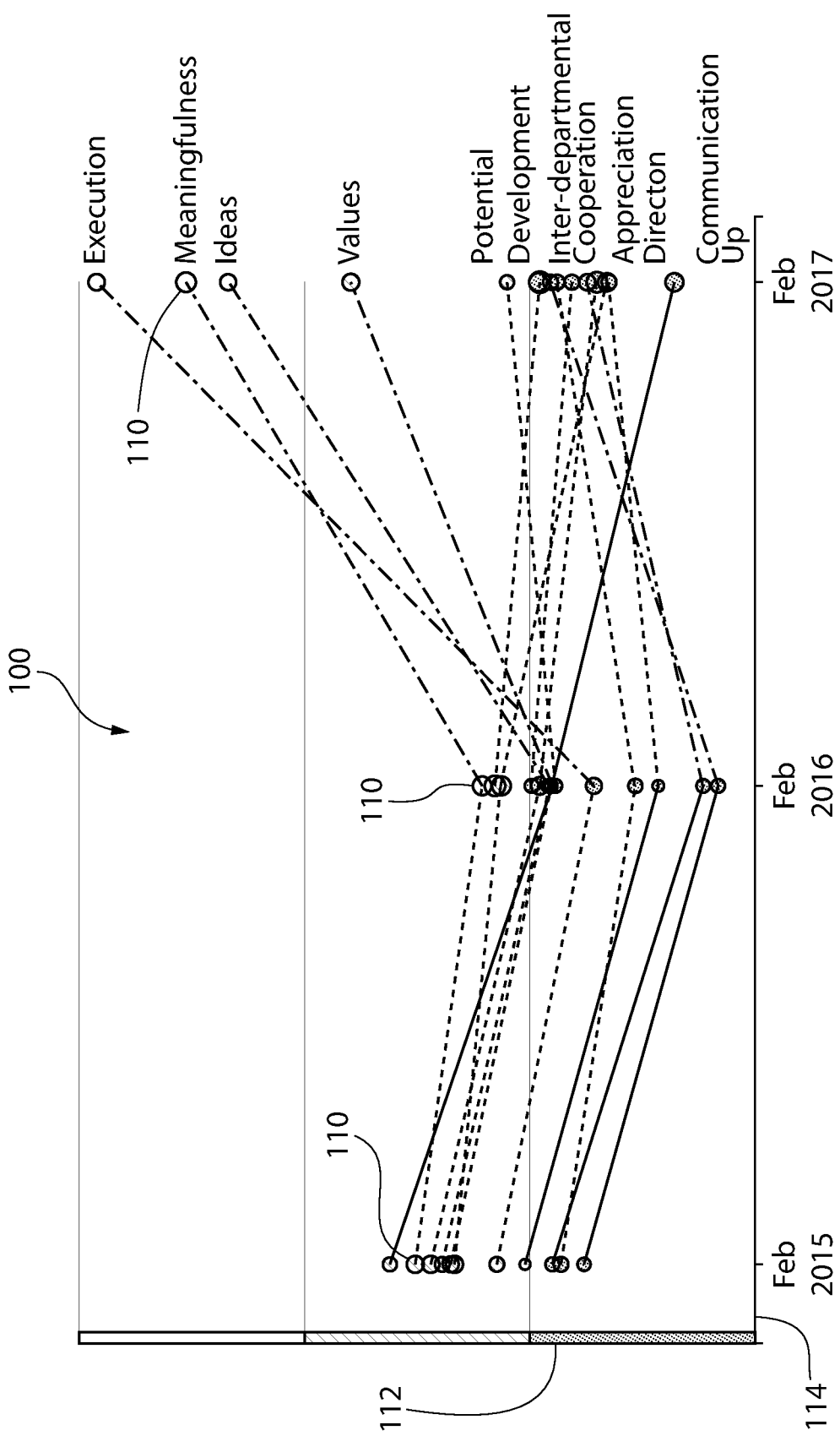
FIGS. 10 and 11 are displays of timeline summaries of survey responses according to an embodiment.
Figure 11:
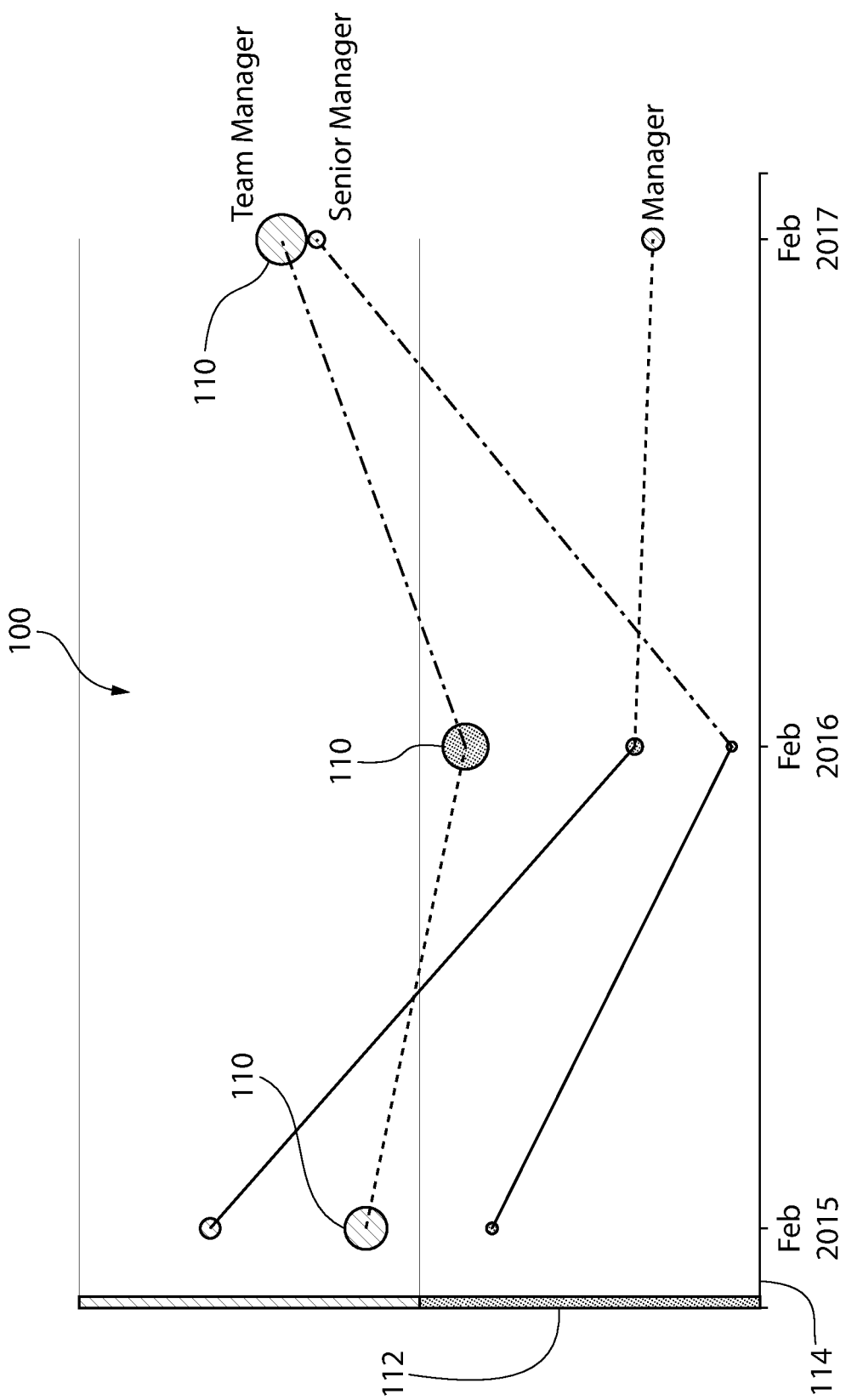

As shown in FIGS. 10 and 11, the display 100 can provide timeline summaries of survey responses. Thus, the display can include, for each response grouping, a plurality of corresponding images and related composite scores for different times when survey responses were received, each of the plurality of corresponding images being located (a) with respect to the first axis, based on the composite score for the response grouping; and (b) with respect to the second axis, based on the time when the survey responses related to the corresponding image were received.

In FIG. 10, the display 100 includes response grouping images 110 that relate to survey responses to survey items or topics regarding organizational health. The organization in question has taken the survey for three years. The display 100 tracks the composite scores for these survey items for each year. The images 100 are located with respect to the first axis 112 based on the composite score for the corresponding item. The images 100 are located with respect to the second axis 114 based on the time of the survey responses. As can be seen, for several survey items, company performance dropped in 2016, but improved in 2017. The lower third of scores are considered low to a potentially noteworthy degree, the middle third of scores are considered as not requiring focused attention, and the higher third of scores are considered so good as to be potentially noteworthy. This can be represented along the first axis 112 with colors red, gray, and green, respectively, and/or one or more bands can be colored on the chart. Further, the color of the image (circle) can correspond with the third of the graph in which the image is located. Further, the lines connecting the images over time can be colored to represent decline (red), improvement (green), or no potentially noteworthy change (gray).

FIG. 11 is similar to FIG. 10, but the display 110 includes response grouping images that relate to demographic segments, specifically, job grade. The display 100 tracks the composite scores for these job grades for each of three years. The images 100 are located with respect to the first axis 112 based on the composite score for the job grade. The images 100 are located with respect to the second axis 114 based on the time of the survey responses. As can be seen, for example, while Senior Manager and Team Member scores have been improving recently, Manager scores have not.

The exemplified display 100 of FIG. 3 can be a user interface 102 that allows the user to select how the survey responses are displayed. Specifically, in the exemplified embodiment, the user interface 102 includes a display control interface 119 that enables the user to control how the response groupings 104 are displayed. In this embodiment, display control interface 119 provides several drop-down menus to determine which response groupings will be displayed and in what manner. In other embodiments, other means can be used for providing the user options for determining how to display the response groupings, such as a series of windows providing the user questions regarding the desired features of the display.

A segment drop-down menu 120 enables the user to select the segments the user wishes to view. In this figure, the "Show all" option has been selected, and thus all segments and items are eligible to be shown on the display. Other options that can be provided by the segment drop down menu 120 include any type of segment, such as a department, a location, employees hired a certain range of time ago, employees whose salary fall within a particular range, part-time employees, employees with a commute within a certain range, employees with a certain performance grade, or employees at a specific management level.

A topic drop-down menu 122 enables the user to select whether to view results from all of the survey items or narrow down to a subset of items or even a single item. A grouping-type drop down menu 124 enables the user to select how the results will be grouped, or put another way, what response groupings will be shown. Because of the calibration provided by the calibrated scores, all grouping types can be combined in one chart, but in other instances a more traditional display can be provided, such as one just showing departments, just showing survey items, or just showing a particular demographic.

A scores drop down menu 126 enables the user to select which scores are displayed. In this figure, the "Top and bottom scores only" option has been selected, and thus the display is limited to showing only the highest and lowest scores, which are likely to indicate the promising and troubling issues for an organization. Other options that can be provided by the scores drop down menu 126 include "Top scores only," "Bottom scores only," and "All scores."

Noteworthiness

The user interface 102 further provides options for ordering the response groupings on the display. In this embodiment, an ordering drop down menu 128 enables the user to select from one of several parameters 130 according to which the displayed response groupings are ordered. Each of these parameters or options can be understood as a different basis for determining the noteworthiness, noteworthiness score, or noteworthiness ranking of a response grouping. The noteworthiness of a response grouping is an indication of how worthy of attention the survey results for the response grouping are, and the noteworthiness score is a numerical representation of the noteworthiness. The noteworthiness ranking is a ranking of a response grouping based on the noteworthiness or noteworthiness score. Using menu 128, the user can select the basis for determining noteworthiness that is most suitable for the particular organization.

The ordering drop down menu 128 provides several parameters for ordering the response groupings. The response groupings can be ordered simply by their composite score (the "Ordered by score" option). In this event, the noteworthiness of a particular response grouping is based on the composite score for the response grouping. As described above, for each response grouping (whether an item or a segment of a combination thereof), the composite score can be determined based on the relevant calibrated scores.

The response groupings can also be ordered according to a score impact, which is a measure of the amount by which that response grouping is moving the overall score of the selected segment from the segment drop down menu 120 up or down. Put another way, if a response grouping was removed, how much would the selected segment's score be different?

The response groupings can also be ordered according to a change in the score from a previous score for the same response grouping. Thus, noteworthiness can be based on a change in the composite score for a response grouping from a previous composite score for the response grouping. The response groupings can also be ordered according to a change impact, which is a measure of an amount by which that response grouping's change is affecting the overall change of the selected segment from the segment drop down menu 120. Put another way, if that response grouping was removed, how much would the selected segment's change score be different?

In certain cases, a previous composite score is unavailable, for example, where there is a new department that does not have an analog in a prior department structure, or where a new item has been added to the survey. Indicating that these response groupings have no change from a previous score is a poor estimation if there is noteworthy change at the organization at large. In one embodiment, to address this issue for a department segment, an average change of a parent-department segment can be used as a basis for determining noteworthiness. Further, other related segments can be used where a previous score is unavailable for a segment.

The response groupings can also be ordered according to (and thus noteworthiness based on) weight, which is a measure of how important each response grouping is. For segments, weight can be based on, for example, a total number of the survey respondents associated with the respondent segment, or a total number of possible survey respondents associated with the respondent segment (respondent or not), an aggregate salary for either of those groups (the bigger the salary, the more weight is given to the response), an aggregate financial contribution made by the group to the organization, some subjective strategic importance multiplier, individual weights assigned to each member of a segment (which can be based on the foregoing), or some combination thereof. Thus, for example, a department having a large number of employees can be given greater weight even if only a small number of those employees actually responded to the survey. The composite score for each department can be multiplied by the number of people in the department. For survey items, weight can be based on, for example, an assigned multiplier, typically determined by correlating responses to the item to some business metric of value to the organization.

The response groupings can also be ordered according to (and thus noteworthiness based on) a combination of any of the metrics or other factors discussed herein, including the metrics for score and change discussed above, and the overlap considerations discussed below. In FIG. 3, noteworthiness is the selected option 132 for ordering the response groupings.

Noteworthiness can also or alternatively be based on other factors (including any combination of the factors discussed herein). For example, noteworthiness can be based on the details of a department segment's parent-department segment. In one embodiment, the collection of respondent segments comprises department segments, and the department segments comprise a parent-department segment having child-department segments. The noteworthiness of a child-department segment can be based on a comparison of the composite scores for child-department segments. Departments that have scores that are very different from the scores of their peer departments under the same parent department can be considered more noteworthy.

Noteworthiness can also be based on coalescence or polarization in the survey responses for the response grouping. In a preferred embodiment, coalescence and polarization are determined at least in part by comparing the survey responses for the response grouping to the benchmark data relevant to the response grouping.

Coalescence and polarization can be calculated by first determining the range of probability of each scale option or lower being chosen for each particular combined segment responding to each particular survey item using benchmark data, which can either be external to the responses being summarized or a superset of the responses being summarized. Each response can then be mapped to that probability range. All responses are weighted equally, so responses are spread thinner across wider probability ranges. If the responses perfectly match the benchmark, then the responses will be evenly spread across the full range of probability. However, this typically is not the case. Typically, the responses will be unbalanced towards the positive or towards the negative, reflecting an average score that is above or below average. However, sometimes the average score will be hiding that the responses will be unbalanced towards both the positive and the negative at the same time, and knowing this is very valuable for understanding how to best interpret the average score and address the underlying issues behind it. To understand this, it's helpful to have a visualization of expectations and visualizations of coalescence and polarization.

In an alternative embodiment, the following sort orders are provided as options: sort by score (where composite score shows how the survey responses compare to what was expected from matching groups of employees), sort by change (where change compares this year's responses to matching groupings of responses from last year), sort by company gap (where company gap is the difference between a department's score and the entire company's score with the same demographic and statement filters), sort by parent gap (where parent gap is the difference between a department's score and its parent department's score with the same demographic and statement filters), sort by importance (where importance captures the real-world impact of a particular score, specifically, how noteworthily a statement or group influences engagement; for groups, it expresses responder count; for statements, it expresses correlation with engagement (aka weight)), sort by blended (focuses on the most interesting results by sorting by a blend of score, change, importance, actionability, polarization, overlap awareness, actionability, and other factors (aka full noteworthiness)), sort by score and importance (sort by a blend of score and change (aka score impact)), sort by change and importance (sort by a blend of change and importance (aka change impact)), sort by score and change (sort by a blend of score and change), sort by score, change, and importance (sort by a blend of score, change, and importance), sort by importance and company gap (sort by a blend of importance and difference from overall company score), sort by importance and parent gap (sort by a blend of importance and difference from parent), and sort by blended ignoring overlap (while the primary "blended" sort deemphasizes lower priority overlapping groups, this sort ignores overlap). As noted elsewhere, any of these options or combination of options discussed herein can be used for displaying and ordering the response groupings.

Visualizing Expectations

Figure 4:
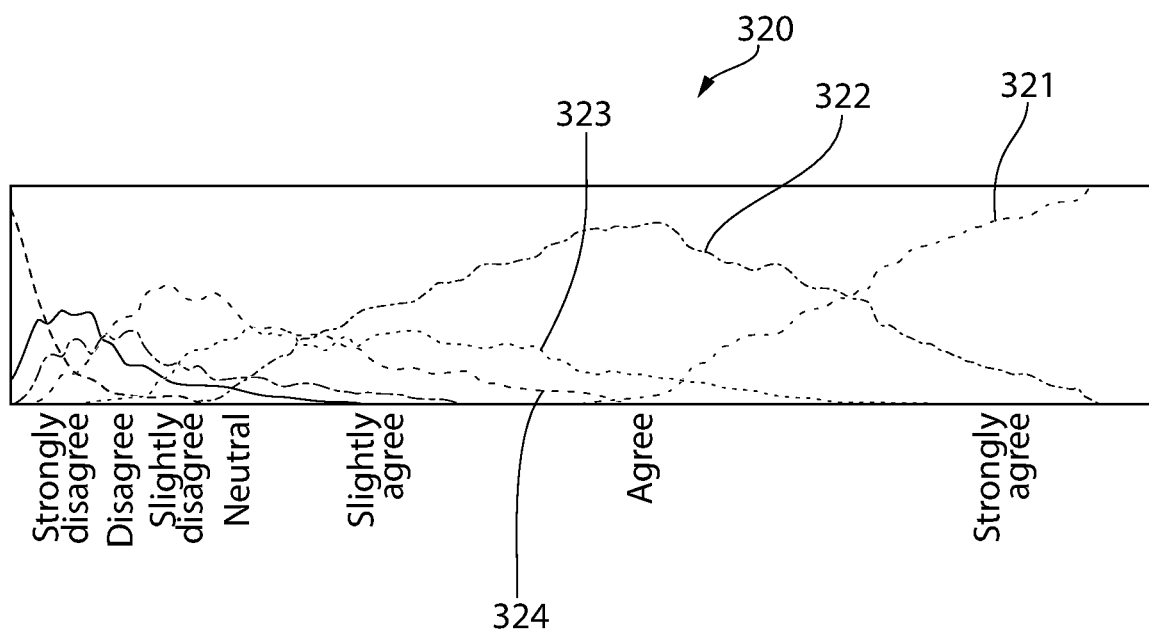
FIG. 4 is a graph showing the expected probability distribution for survey responses according to one embodiment.

FIG. 4 is a graph showing the expected probability distribution for survey responses according to one embodiment. As shown, the expected probability distribution can be visualized with a rectangle, with each vertical slice representing a percentage of responses expected to be spread across that probability of having that score or more extreme. Where the expected probability distribution originated (in terms of the original response scale) can be visualized by drawing curves that represent how each response option (e.g., Strongly agree, Agree, Slightly Agree) is distributed within the rectangle representing expectations. For example, curve 321 shows that all of the highest probabilities (e.g., from about the 95% mark and up) came from Strongly Agree responses. From a probability mark of about 80% down to 95%, the responses came from a combination of Strongly Agree and Agree (curve 322). Below about 80%, a very small number of Slightly Agree responses (curve 323) started to be included. Around the 50% probability mark, there are no more Strongly Agree responses. Agree responses make up the bulk of the responses, and a small percentage of Slightly Agree and Neutral responses (curve 324) are contributing. The area under the different colored curves varies and is proportional to the percentage of responses that came from the corresponding response options. Another characteristic of the visualization is that if you add up the heights of the curves at any particular horizontal location, the sum will be the height of the expectation rectangle.

Figure 5:
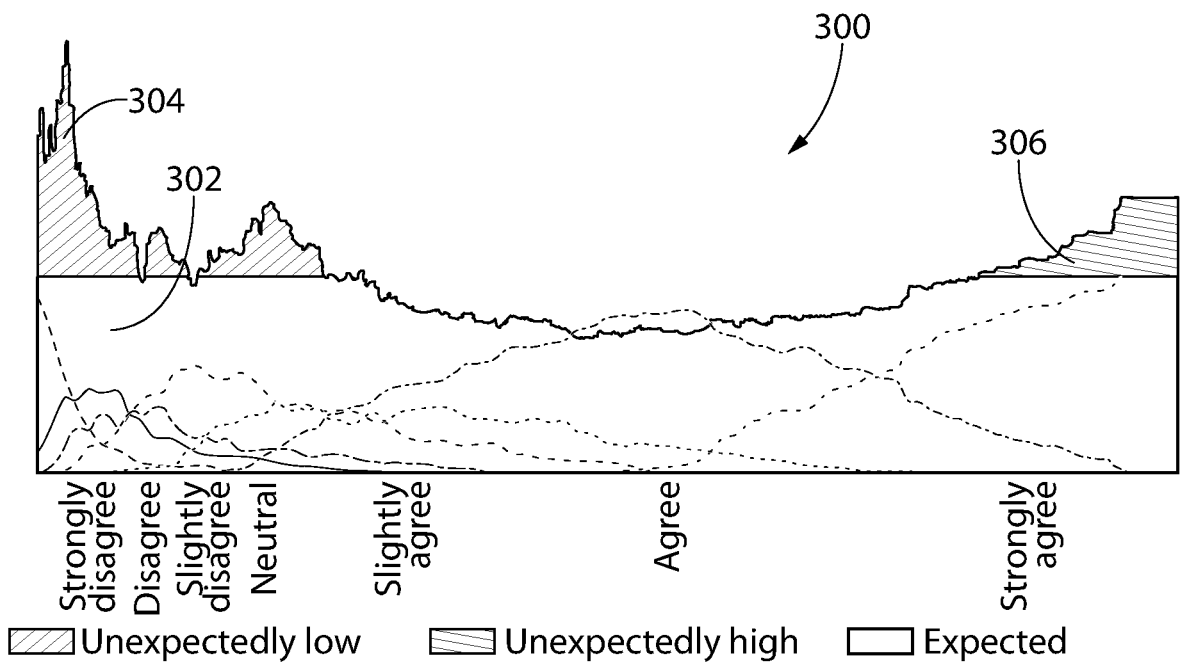
FIG. 5 is a graph showing polarization in survey responses according to one embodiment.

If there are more responses in the probability extremes or "tails," this is indicative of polarization. FIG. 5 is a graph 300 showing polarization in survey responses. The response options correspond with the response scale of Strongly Disagree, Disagree, Slightly Disagree, Neutral, Slightly Agree, Agree, and Strongly Agree. The portion 302 is indicative of responses that are as expected. The negative tail 304 is indicative of the more negative responses than expected, and the positive tail 306 is indicative of the more positive responses than expected.

Figure 6:
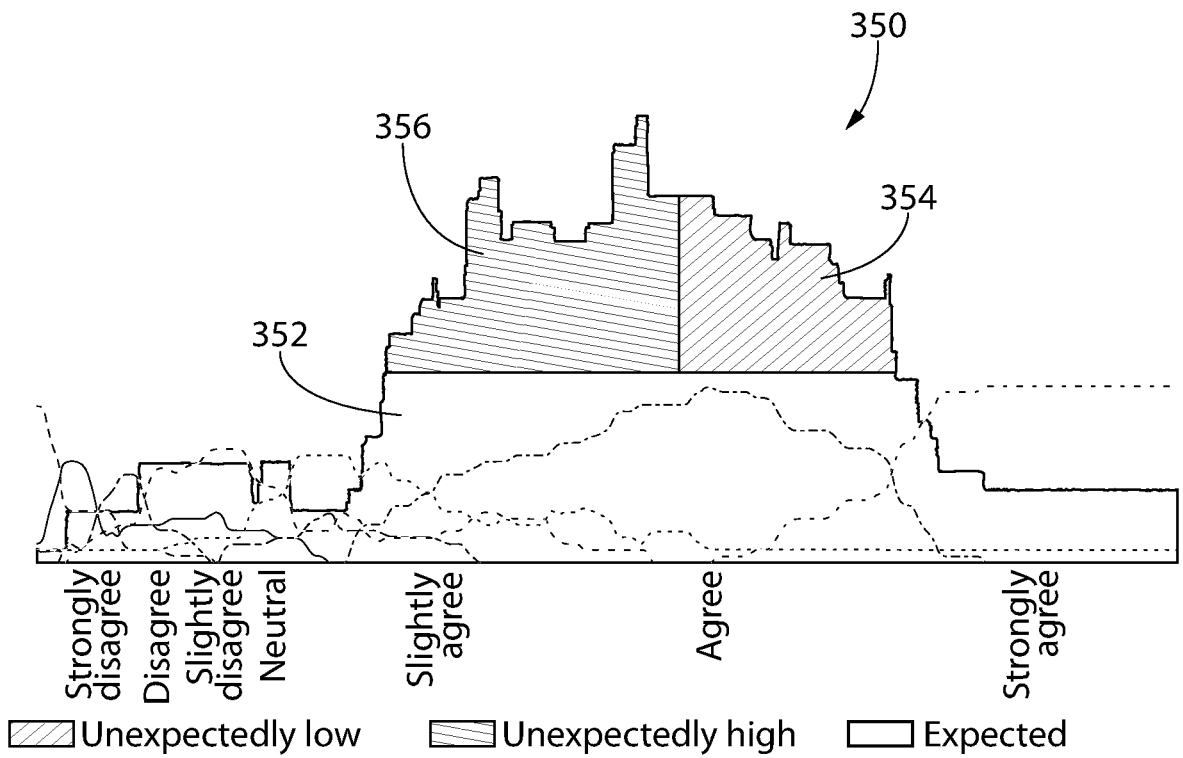
FIG. 6 is a graph showing coalescence in survey responses according to one embodiment.

By contrast, if there are more responses in the middle, this is indicative of coalescence. FIG. 6 is a graph 350 showing coalescence in survey responses. Again, the response options correspond with the response scale of Strongly Disagree, Disagree, Slightly Disagree, Neutral, Slightly Agree, Agree, Strongly Agree. Portion 352 is indicative of responses that are as expected. Portion 356 is indicative of unexpectedly high responses, and portion 354 is indicative of unexpectedly low responses.

A sense of how unusual the distribution is can be calculated by looking at how much the responses vary from the mean probability for the population being summarized. One such technique is to calculate the average distance of the probability-spread responses from the mean probability. Values for coalescence range from 0 (large) to 0.25 (none). Values for polarization range from 0.25 (none) to 0.5 (large).

Additional Noteworthiness Factors Such as Overlap

The noteworthiness of a response grouping can also be based on an actionability index that is indicative of the ease or difficulty in addressing the response grouping. In one embodiment, actionability can be based on the ease in getting a segment together. For example, it is harder to get the employees who have worked with the company from 1-3 years together than it is to get the sales team together. Further, it is harder to get the sales team together than it is to get the Boston sales team together. The actionability index can be used to identify response groupings that, when addressed, will have a higher impact per person.

Noteworthiness can be based on other or additional factors. For example, noteworthiness can take into consideration a composite score and the biggest components of what is pulling it down (or up), including overlaps. Given a focus area, this allows the system to narrow down options and be smarter about matters such as demographics. For example, if Sales and the 10-15 Year tenure segment both have low scores, but it is the overlapping Sales members in the 10-15 Year tenure band that are pulling things down, the system can narrow in on that. Or if the system determines that, for the most part, those groups completely overlap, the system can focus on Sales because that is an easier group to think about.

In one embodiment, the method removes overlap where there is a proper subset. Specifically, the method comprises (a) among the respondent segments, identifying a first segment and a second segment as having overlapping respondents; (b) identifying the first segment respondents as being a proper subset of the second segment respondents; (c) reducing the noteworthiness ranking of the second segment if a second segment noteworthiness score is closer to an average noteworthiness score than a noteworthiness score for survey respondents belonging to the second segment but not the first segment; and (d) reducing the noteworthiness ranking of the first segment if a first segment noteworthiness score is closer to an average noteworthiness score than a noteworthiness score for survey respondents belonging to the second segment but not the first segment. In other embodiments, step (c) or (d) can be omitted. The average noteworthiness score can be based on any average of noteworthiness scores, including the average noteworthiness score for all the response groupings of an organization being surveyed, the average noteworthiness score for a relevant scope of response groupings within the organization, and an average noteworthiness score based on noteworthiness scores from a collection of organizations.

Figure 9A:
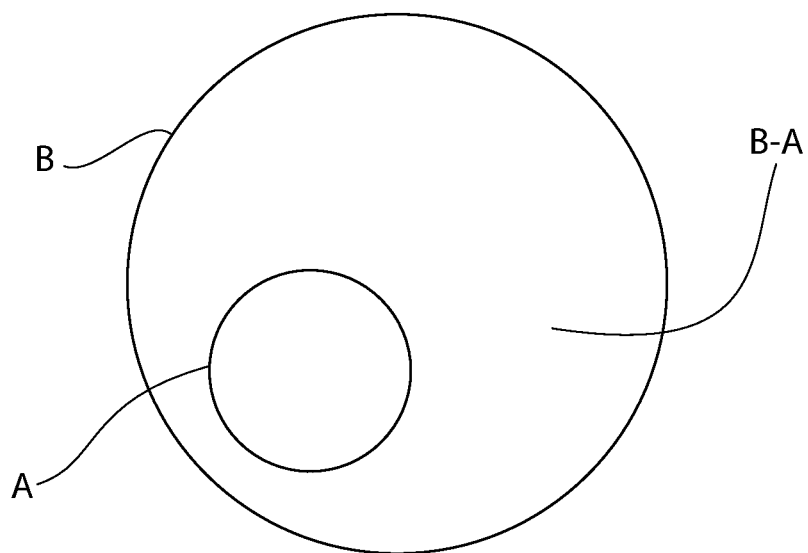
FIGS. 9A and 9B are Venn diagrams representing overlapping segments according to one embodiment.

For example, Sales in Boston can be considered a proper subset of Sales Global. FIG. 9A illustrates a proper subset, where Sales Global is represented by circle B and Sales Boston is represented by circle A, since all members of Sales Boston belong to Sales Global. Further, portion B-A represents those members of segment B that do not belong to segment A (that is, those in Sales Global that do not belong to Sales Boston). In this example, the noteworthiness score of segment B is compared with the noteworthiness score of segment B-A. If the segment B-A score is closer to the average than the whole of segment B, this indicates that subset segment A is the reason for the noteworthy (low or high) score, and therefore the system can treat the whole of segment B as less noteworthy, and thus decrease segment B's noteworthiness ranking. Otherwise, this indicates that segment B is the noteworthy group to take action on, and the system can treat segment A as less noteworthy, and thus decrease segment A's noteworthiness ranking. In an embodiment, the difference between the scores mentioned above must be "wider" than a predetermined material amount (e.g., 20 centilogits). In other embodiments, other combinations of scores can be compared, such as a comparison of segment A and segment B-A.

Further, in certain embodiments, the method can remove overlap where there is a large degree of overlap but not a proper subset. Specifically, the method can comprise the following steps: if the first segment respondents are a not a proper subset of the second segment respondents, then (a) if a first segment noteworthiness score is close to a second segment noteworthiness score, then reducing the noteworthiness ranking of the less actionable of the first segment and the second segment; and (b) if the first segment noteworthiness score is not close to the second segment noteworthiness score, then reducing the noteworthiness ranking of the segment having a noteworthiness score closer to an average noteworthiness score; wherein the first noteworthiness score and the second noteworthiness score are close if either the scores differ by a predetermined percentage or amount; or a distance between the scores exceeds a difference between a benchmark first percentile score and a benchmark second percentile score; and wherein the actionability of a segment is based on an ease or difficulty in addressing the response grouping.

Figure 9B:
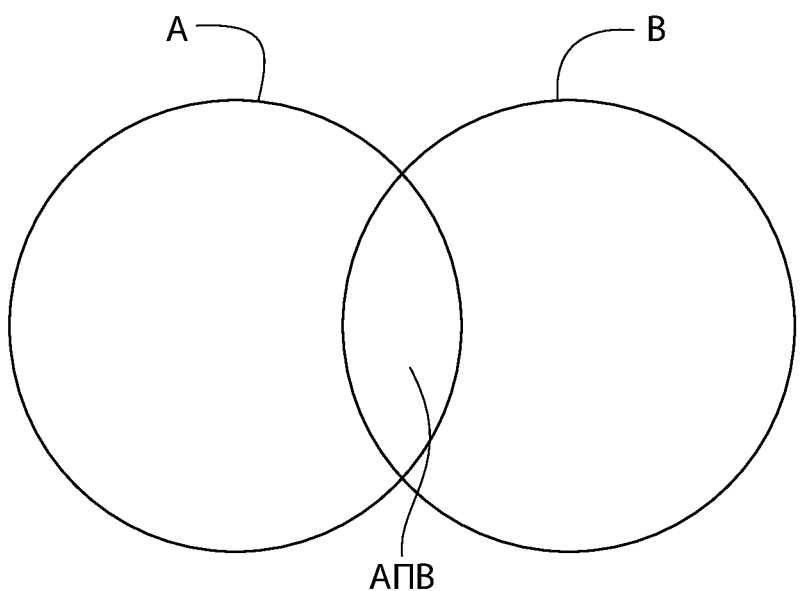

For example, Executives and Salary Greater Than $100 k will have overlap, but neither is a perfect subset of the other. FIG. 9B illustrates such an overlap, where Executives is represented by circle A and Salary Greater Than $100 k is represented by circle B, and the overlap where A intersects be is represented by the portion labeled A∩B. In this example, if the scores for the overlapping segments are close, then the system treats the less actionable segment as less noteworthy. Determining whether scores are close can be based on an arbitrary number, but more typically, it will be the score change observed along an agreed upon percentile difference that is meaningful to the company, for example, the distance in scores between the company in their benchmark at the 25th percentile and the company in their benchmark at the 75th percentile. The actionability of a segment can based on an ease or difficulty in addressing the item. For example, Top Executives are more actionable than Salary Greater than $100 k, because it is far less awkward to get Top Executives in a room together to address an issue than it is to call a meeting of people making more than $100 k, which would reveal salary information in a way that most companies choose to avoid.

If the overlapping segment scores are not close, then the system treats the closer-to-average segment as less noteworthy. For instance, if Executives are noteworthy and Salary Greater Than $100 k is similarly noteworthy, and these are substantially the same set of people, then it is not helpful to state that both are noteworthy.

It is noted that the steps discussed herein for determining noteworthiness scores and adjusting noteworthiness rankings can be carried out in various orders. In one embodiment, the noteworthiness ranking is first determined based on the composite score for each response grouping; a change in the composite score for the response grouping from a previous composite score; and the actionability of the response grouping. Subsequently, adjustments to the noteworthiness rankings are made based on overlap. In other embodiments, adjustments can be carried out in different orders.

In certain embodiments, the displayed response groupings can include a combination of two or more of the respondent segments and the plurality of survey items. Thus, instead of just looking at each of the segments and items, the system can also look at every combination of segments and items together. For example, the system can look at Sales but also see all of Sales' demographic groupings and all survey items responded to by Sales employees. For example, if it is really Sales New Hires that are the problem, the system can show this instead of focusing simply on Sales being the problem. Or it can be that the survey item Appreciation in Sales is the problem. In one embodiment, for each segment showing up as noteworthy, the system decomposes the segment into all of its items and subsegments, adds them to the sort order, and runs the process again to see if the proper subset overlap process finds something more noteworthy than just looking at the top-level segment.

In certain embodiments, sequenced demographics can be combined. A sequenced demographic is an ordinal segmenting. For example, one can easily order salary bands, tenure bands, or commute lengths according to a sequence (e.g., lowest to highest, or shortest to longest). A non-sequenced demographic might be job role, since one cannot easily sequence line cooks, wait staff, and maintenance personnel. The system can consider every possible set of two or more adjacent sequenced segments to find those most interesting. For example, rather than show that the Less Than 6 Months group and the 6 to 12 Month group scores are worth attention, it is more meaningful to say that the Less than 1 Year group is the real problem. This can be done similarly for other segments, such as salary ranges. The process for combining sequenced demographics can be carried out, in one embodiment, by considering, in addition to the demographics, combinations of sequenced demographics, and then performing the proper subset check discussed above. In such an embodiment, the system can add combinations of sequenced demographics to the sort order, and run the process again to determine whether the proper subset overlap process discussed above finds a more noteworthy combination.

In certain embodiments, for non-sequenced demographics (such as departments and locations), combinations can be created by putting together all the combinations that exclude exactly one segment. For example, a Sales department may have four teams: East, West, North, and South. In addition to looking at Sales overall and the individual teams, the system can combine together all but one, namely, (1) Sales except East (West, North, South), (2) Sales except West (East, North, South), (3) Sales except North (East, West, South), and (4) Sales except South (East, West, North). If South is responding much more positively than the other teams, it is more interesting to identify that Sales except South is noteworthy than to simply identify Sales as noteworthy, and thus Sales except South is what should be presented to leadership as needing focused attention. In another example, it is more interesting to identify that "All the locations except headquarters" score poorly. Similar to combining sequenced demographics, this process can include adding the above combinations to the sort order and then determining whether the proper subset overlap process discussed above finds a more noteworthy combination.

In certain embodiments, the system can ensure that a celebration (an indication of a noteworthy positive ranking) does not have bad components. Thus, the noteworthiness ranking of a response grouping can be based in part on whether an aspect of the response grouping falls below or above a predetermined threshold. For example, each of the components of an algorithm determining noteworthiness can have a threshold of "badness" that, if met, will automatically cause a segment to be treated as substantially less noteworthy so that the segment having some badness (e.g., a score below benchmark, or a large drop from a previous score), does not show up as a celebration.

Noteworthiness can also be based on a multiplier. For example, there can be a multiplier per individual respondent, per segment, and/or per item. These multipliers can be based on any of the factors discussed herein, or any combination thereof. A segment multiplier, for example, can be based on the average or aggregate salary of those associated with the segment. Further, a segment multiplier can be based on how actionable the segment is. Further, a segment multiplier can be based on how many top performers are in a segment, where segments with more or a higher percentage of top performers are given more weight.

An individual multiplier can be based on salary, but other bases for the multiplier can be used, such as respondent tenure, aggregate salary, respondent salary, respondent management level, respondent role, respondent performance ratings, or some combination thereof.

A survey item multiplier can be calculated by determining how the logit-based item composite scores correlate to a business metric of interest. An example of one such method would be to use Pearson's product-moment correlation coefficient to determine the extent to which respondent responses to various survey items relate to their individual productivity. In other embodiments, the multipliers discussed herein can be chosen simply based on a value the organization decides to give to a given person, segment, or item.

Method for Generating Display

Figure 7:
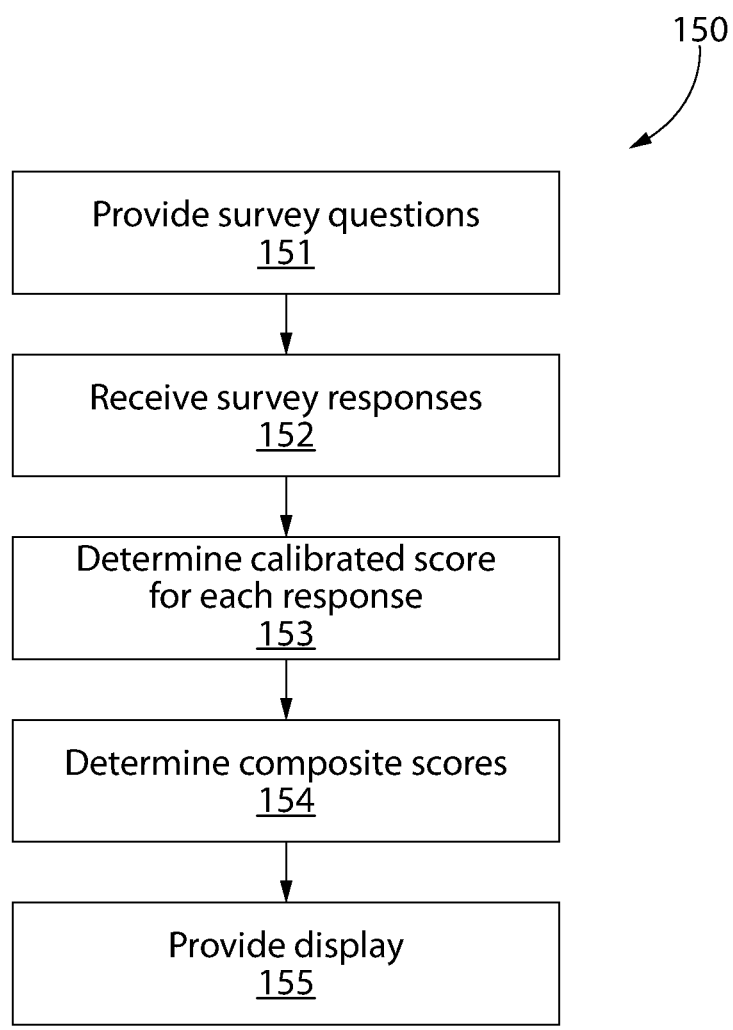
FIG. 7 is flowchart for a method for generating a display summarizing survey responses according to an embodiment.

FIG. 7 is a flowchart for one method 150 for generating a display summarizing survey responses. In this embodiment, a system provides survey items to survey respondents (operation 151). The system then receives survey responses thereto (operation 152). The system then determines a calibrated score for each response (operation 153). The system then determines composite scores for each response grouping (e.g., each survey item and each segment) (operation 154). The system then provides a display based on the composite scores (operation 155). The invention is not limited to this exemplified method, as other or additional operations can be included. For example, after determining composite scores, the method can use one or more of the factors discussed herein to determine a noteworthiness ranking for each response grouping, and the displayed response groupings can be ordered according to the determined noteworthiness rankings.

Alternative Display

Figure 8:
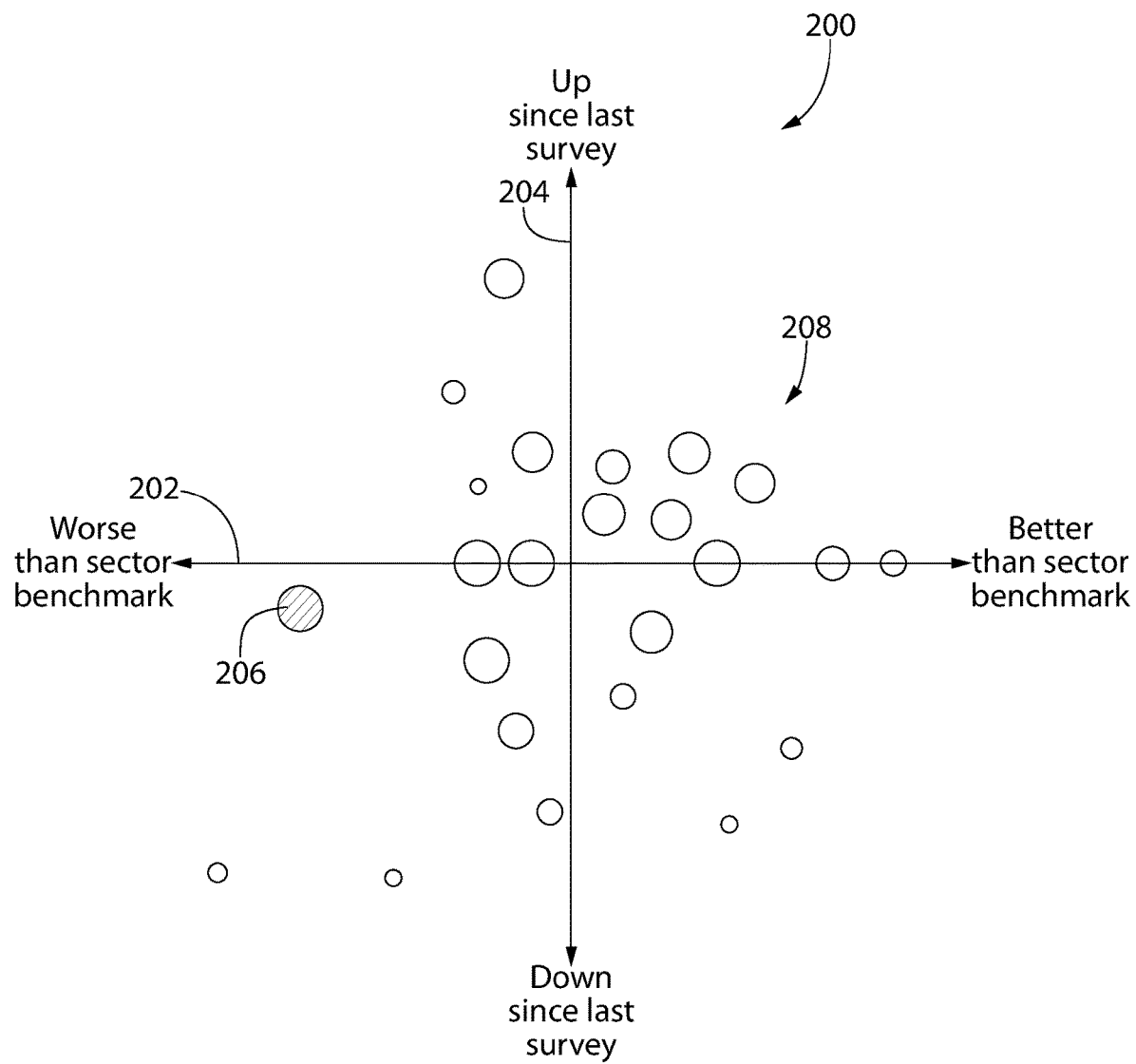
FIG. 8 is a display of a summary of survey responses according to another embodiment.

FIG. 8 is a display 200 of a summary of survey responses according to another embodiment. This graph is similar to the display of FIG. 3 in that the position of the images 208 with respect to the first axis 202 is based on a composite score. Further, like the display of FIG. 3, the size of the image is based on one or more details about the associated response grouping (e.g., total number of the survey respondents, total number of possible survey respondents, or a multiplier). Other features of FIG. 3, such as coalescence and polarization indicators, can also be included in display 200.

The primary differences from FIG. 3 are that there are no arrows indicating the change in composite score, and there is no list of response groupings along a first axis. Rather than arrows, FIG. 8 includes a second axis 204. The images 208 are located with respect to the second axis 204 based on the change in composite score since the last survey. Further, rather than listing the response groupings along a first axis, the identity of the response groupings can be omitted, or can be displayed by various alternative means, such as by placing text next to the image, or by having descriptive text appear when the image is selected or hovered over using a mouse pointer. In the exemplified embodiment, the image 206 corresponds with an item of particular interest to the organization generating the display, though the inventions are not so limited.

Results for any segment or item (or combination thereof) can be displayed using this approach to show how response groupings within a selected organization compare to each other. Thus, for example, different departments within a company can each have a department organizational score, the department organizational score being based on the calibrated scores for each survey response of each respondent of the relevant department. Each department can be represented by an image (e.g., circle) on the graph corresponding with the department organizational score.

Comparing Organization Composite Scores

The graph of FIG. 8 can also be used to display 200 a summary of survey responses for different organizations according to another embodiment. By this alternative understanding of FIG. 8, the display 200 includes a first axis 202 corresponding with an organization composite score, the organization composite score being based on the calibrated scores for each survey response of each respondent of the organization.

The organization being surveyed has an image 206 corresponding with the organization composite score for that organization. The display further includes additional images 208 corresponding with the organizational composite scores for other organizations. Each image is located with respect to a first axis based on the associated organization composite score. This enables the surveyed organization to see visually how it compares to other organizations.

As shown, the exemplified display 200 can also include a second axis 204. Each image can be located with respect to the second axis based on a change to the associated organization composite score. In other embodiments, this feature can be omitted.

Advantages

The above methods avoid the aforementioned shortcomings of other methods of summarizing survey responses, such as information loss, lack of calibration, the assumption that response options are equidistant from one another, and the assumption that it is valid to calculate a standard deviation from Likert-type scale response data. The methods described herein can more appropriately weight passion and outliers, leading to better group decision-making. The technologic modifications solve the above problems and improve the functioning of survey systems by, among other things, helping organizations identify the most noteworthy results of a survey. This allows an organization to quickly and accurately identify the areas most ripe for impactful change, thus allowing the organization to focus its limited time and resources on those areas. The methods also enable the comparison of survey items with other response groupings, such as categories of employees. The methods described herein provide an improvement to the capability of survey systems as a whole.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention or inventions have been described with respect to specific examples, those skilled in the art will appreciate that there are numerous variations and permutations of the above described invention(s). It is to be understood that other embodiments may be utilized and structural and functional modifications may be made without departing from the scope of the present invention(s). Thus, the spirit and scope should be construed broadly as set forth in the appended claims.

What is claimed is:

1. A method of displaying survey results, the method comprising:
    a) for each of a plurality of survey items, receiving survey responses from survey respondents, wherein:
        i) each response is chosen from response options, the response options corresponding to an ordinal scale;
        ii) each respondent is associated with a collection of respondent segments; and
        iii) each response to each item by each survey respondent corresponds with a response score;
    b) for each item, determining a composite score based on the response score for each response to the item;
    c) for each respondent segment, determining a composite score based on the response score for each response associated with the respondent segment; and
    d) providing a display of response groupings, the displayed response groupings comprising at least a portion of the plurality of items and the collection of respondent segments;
    e) wherein the response groupings are located on the display along a first axis; and
    f) wherein the display includes, for each response grouping, a corresponding image, the corresponding image being located with respect to the first axis or a distinct second axis according to a noteworthiness ranking, the noteworthiness ranking being based on at least two of:
        i) the composite score for the response grouping;
        ii) a change in the composite score for the response grouping from a previous composite score for the response grouping; and
        iii) a sum of weights for each respondent segment, where each survey respondent or possible survey respondent is assigned a weight.

2. The method of claim 1 wherein the noteworthiness ranking is based on each of:
   i) the composite score for the response grouping;
   ii) a change in the composite score for the response grouping from a previous composite score for the response grouping; and
   iii) a sum of weights for each respondent segment, where each survey respondent or possible survey respondent is assigned a weight.

3. The method of claim 1 wherein the response score for each response is determined based on whether the response is positive or negative, an integer assignment, or z-scores.

4. The method of claim 1 wherein the response score for each response is a calibrated score, the calibrated score based on a probability that a person having the collection of respondent segments associated with the survey respondent would provide either:
   i) the response to the item or any of the response options to the item that are lower on the ordinal scale; or
   ii) the response to the item or any of the response options to the item that are higher on the ordinal scale.

5. The method of claim 4 wherein the calibrated scored is further based on benchmark data, and the benchmark data comprises a calibrated score for each response option for each item for each possible collection of respondent segments.

6. The method of claim 4 wherein each calibrated score is a logit-based score.

7. The method of claim 1,
   a) wherein the collection of respondent segments comprises demographic segments and department segments; and
   b) wherein the demographic segments are associated with at least one of respondent tenure, respondent hours worked, respondent salary range, respondent management level, and respondent role.

8. A non-transitory computer-readable storage medium encoded with instructions which, when executed on a processor, perform the method of:
   a) for each of a plurality of survey items, receiving survey responses from survey respondents, wherein:
      i) each response is chosen from response options, the response options corresponding to an ordinal scale;
      ii) each respondent is associated with a collection of respondent segments; and
      iii) each response to each item by each survey respondent corresponds with a response score;
   b) for each item, determining a composite score based on the response score for each response to the item;
   c) for each respondent segment, determining a composite score based on the response score for each response associated with the respondent segment; and
   d) providing a display of response groupings, the displayed response groupings comprising at least a portion of the plurality of items and the collection of respondent segments;
   e) wherein the response groupings are located on the display along a first axis; and
   f) wherein the display includes, for each response grouping, a corresponding image, the corresponding image being located with respect to the first axis or a distinct second axis according to a noteworthiness ranking, the noteworthiness ranking being based on at least two of:
      i) the composite score for the response grouping;
      ii) a change in the composite score for the response grouping from a previous composite score for the response grouping; and
      iii) a sum of weights for each respondent segment, where each survey respondent or possible survey respondent is assigned a weight.

9. The medium of claim 8 wherein the noteworthiness ranking is based on each of:
   i) the composite score for the response grouping;
   ii) a change in the composite score for the response grouping from a previous composite score for the response grouping; and
   iii) a sum of weights for each respondent segment, where each survey respondent or possible survey respondent is assigned a weight.

10. The medium of claim 8 wherein the response score for each response is determined based on whether the response is positive or negative, an integer assignment, or z-scores.

11. The medium of claim 8 wherein the response score for each response is a calibrated score, the calibrated score based on a probability that a person having the collection of respondent segments associated with the survey respondent would provide either:
    i) the response to the item or any of the response options to the item that are lower on the ordinal scale; or
    ii) the response to the item or any of the response options to the item that are higher on the ordinal scale.

12. The medium of claim 11 wherein the calibrated scored is further based on benchmark data, and the benchmark data comprises a calibrated score for each response option for each item for each possible collection of respondent segments.

13. The method of claim 11 wherein each calibrated score is a logit-based score.

14. The method of claim 1,
    a) wherein the collection of respondent segments comprises demographic segments and department segments; and
    b) wherein the demographic segments are associated with at least one of respondent tenure, respondent hours worked, respondent salary range, respondent management level, and respondent role.

15. A system for displaying survey results, the system comprising:
    a) respondent devices configured to receive survey items and communicate survey responses to the items; and
    b) a server configured to carry out the steps of:
       i) for each item, receiving survey responses from respondent devices, wherein:
          (1) each response is chosen from response options, the response options corresponding to an ordinal scale;
          (2) each respondent is associated with a collection of respondent segments; and
          (3) each response to each item by each survey respondent corresponds with a response score;
       ii) for each item, determining a composite score based on the response score for each response to the item;
       iii) for each respondent segment, determining a composite score based on the response score for each response associated with the respondent segment; and
       iv) providing a display of response groupings, the displayed response groupings comprising at least a portion of the plurality of items and the collection of respondent segments;
       v) wherein the response groupings are located on the display along a first axis; and
       vi) wherein the display includes, for each response grouping, a corresponding image, the corresponding image being located with respect to the first axis or a distinct second axis according to a noteworthiness ranking, the noteworthiness ranking being based on at least two of:
(1) the composite score for the response grouping;
(2) a change in the composite score for the response grouping from a previous composite score for the response grouping; and
(3) a sum of weights for each respondent segment, where each survey respondent or possible survey respondent is assigned a weight.

16. The system of claim 15 wherein the noteworthiness ranking is based on each of:
i) the composite score for the response grouping;
ii) a change in the composite score for the response grouping from a previous composite score for the response grouping; and
iii) a sum of weights for each respondent segment, where each survey respondent or possible survey respondent is assigned a weight.

17. The system of claim 15 wherein the response score for each response is determined based on whether the response is positive or negative, an integer assignment, or z-scores.

18. The system of claim 15 wherein the response score for each response is a calibrated score, the calibrated score based on a probability that a person having the collection of respondent segments associated with the survey respondent would provide either:
i) the response to the item or any of the response options to the item that are lower on the ordinal scale; or
ii) the response to the item or any of the response options to the item that are higher on the ordinal scale.

19. The system of claim 18 wherein the calibrated scored is further based on benchmark data, and the benchmark data comprises a calibrated score for each response option for each item for each possible collection of respondent segments.

20. The system of claim 18 wherein each calibrated score is a logit-based score.

* * * * *